United States Patent [19]

Cheung

[11] 4,292,260
[45] Sep. 29, 1981

[54] MOLDING OPTICAL FIBER CONNECTORS

[75] Inventor: Nim K. Cheung, Bayonne, N.J.

[73] Assignee: Bell Telephone Laboratories, Incorporated, Murray Hill, N.J.

[21] Appl. No.: 189,191

[22] Filed: Sep. 22, 1980

[51] Int. Cl.³ .............................................. B29D 11/00
[52] U.S. Cl. ...................................... 264/1.5; 264/275
[58] Field of Search ......................... 264/1.5, 229, 275; 425/808

[56] References Cited

U.S. PATENT DOCUMENTS

| | | | |
|---|---|---|---|
| 2,724,422 | 11/1955 | Siegerist | 153/98 |
| 2,876,499 | 3/1959 | Schultz. | |
| 2,920,661 | 1/1960 | Drukker | 140/147 |
| 3,255,280 | 6/1966 | Burrowes | 264/1.5 |
| 4,107,242 | 8/1978 | Runge | 264/1.5 |
| 4,173,389 | 11/1979 | Curtis | 350/96.2 |

Primary Examiner—James B. Lowe
Attorney, Agent, or Firm—David R. Padnes

[57] ABSTRACT

An improved molded optical fiber connector is achieved using an insert (111) disposed about the optical fiber. During molding, filler material (112) pushes the insert along the optical fiber (106) until it abuts a mold surface (110) comprising a portion of the connector mating end. This sliding action reduces any bends in the fiber and controls the position and angle of the fiber relative to the mating end. Use of the insert is suitable for the molding of low-loss monomode or multimode optical fiber connectors.

7 Claims, 8 Drawing Figures

MOLDING OPTICAL FIBER CONNECTORS

TECHNICAL FIELD

The present invention relates to a method of molding optical fiber connectors so that fiber bends are eliminated and fiber positioning is more precisely controlled.

BACKGROUND OF THE INVENTION

The widespread implementation of lightwave or optical transmission systems requires the use of connectors to couple and uncouple optical fibers for installation, testing and maintenance. In general, a practical connector must be capable of repeated couplings with a minimum of optical signal loss. Obviously, the connector should also be relatively inexpensive to manufacture.

Two types of optical fibers can be employed in optical transmission systems. Nonomode fibers transmit only one mode of light while multimode fibers allow multiple modes to propagate. Structurally, the diameter of the light transmitting core of a monomode fiber is 5-10 microns ($\mu$m), or approximately one-fifth to one-tenth the core diameter of a multimode fiber. A low-loss optical connection typically requires the alignment of two fiber cores end-to-end. Monomode optical connectors, therefore, generally require considerably more precision than their multimode counterparts.

The molding of optical fiber connectors is one process being investigated for the fabrication of large numbers of economical, low loss connectors. One problem with molding a connector about an optical fiber is the bending of the fiber during molding. Such ending produces signal losses by allowing light to radiate out of the inner core of the fiber to its outer cladding. Severe bending can, of course, cause fiber breakage. Bending of the optical fiber also produces variations in the position of the optical fiber with respect to the mating end of the connector and the angle therebetween. These variations cause misalignment of the light transmitting fiber cores and thus signal losses when two connector halves are coupled together. While prior art techniques, such as that set forth in pending application Ser. No. 96,519, filed Nov. 21, 1979 and assigned to the present assignee, have addressed the problem of fiber bending, the tolerances on fiber location with respect to the mating end of the connector are not precise enough for use in the molding of low-loss monomode optical fiber connectors. This limitation is significant since monomode fibers transmit higher bit rate optical signals with less dispersion per unit distance than multimode fibers and are, therefore, extremely desirable for high-speed, long haul transmission systems.

SUMMARY OF THE INVENTION

Pursuant to the present invention, an improvement in molded optical fiber connectors is achieved through the use of an insert placed within the mold cavity. The insert slides along the optical fiber under the force of the mold material until it abuts a portion of the mold cavity defining the mating end of the connector. The sliding of the insert until abutment reduces fiber bending and controls the position of the fiber with respect to the mating end of the connector. In addition, the fiber is maintained at a precise angle to the mating end. This control of fiber position angle, and bending reduces connector losses and permits the molding of low-loss monomode optical fiber connectors.

DETAILED DESCRIPTION

Figure 1:
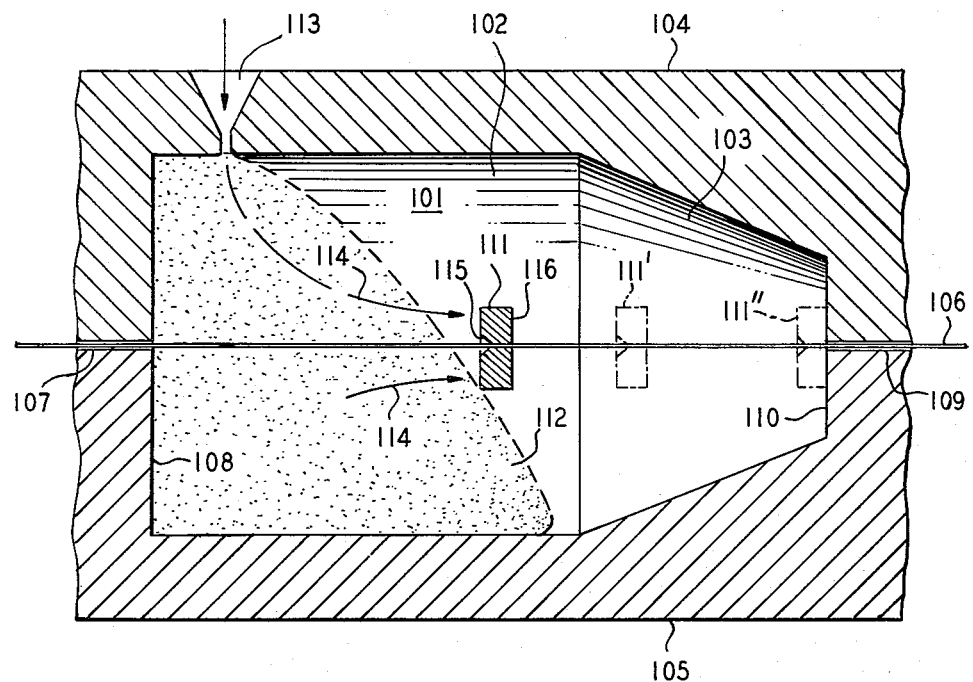
FIG. 1 is a cross-sectional view of a mold cavity for an illustrative optical fiber connector shown for purposes of exemplifying the present invention.

The mold structure for fabricating an illustrative single optical fiber connector is shown in FIG. 1. Details on this connector are covered in U.S. Pat. No. 4,107,242 to P. K. Runge, issued Aug. 15, 1978, entitled "Method of Fabricating Optical Fiber Connectors". Mold cavity 101, comprising mold portions 102 and 103, is formed by mold halves 104 and 105. Optical fiber 106 extends completely through mold cavity 101 from first aperture 107 in wall 108 to a second aperture 109 in wall 110. Second aperture 109 extends perpendicularly from wall 110 which forms the planar end face of portion 103. Portion 103 defines a frustoconical shape used in the alignment and mating of two connectors end-to-end. Filler material 112 is introduced into mold cavity 101 through gate 113. While only one gate 113 is shown, it should, of course, be understood that a mutliple number of gates could be utilized.

In accordance with the present invention, optical fiber 106 is also slidingly fed through insert 111 within cavity 101. The insertion of the fiber through the insert occurs either before placement of the optical fiber in the mold cavity or after insertion through either one of the above-described first and second apertures. The former case, of course, implies that the parting line of the mold passes through the first and second apertures. To facilitate insertion, the aperture within insert 111 is preferably provided with a countersunk entranceway 115. Insert 111 is positioned or located between gate 113 and second aperture 109 with flat surface 116 oriented toward second aperture 109. Surface 116 is perpendicular to the aperture is insert 111. While insert 111 can be fabricated from a variety of materials capable of withstanding the molding tempertures and pressures, the use of a ruby or sapphire jewel works satisfactorily. It should be noted that insert 111 can have any cross-sectional shape so long as the insert can slide along the fiber during molding.

During molding, the force of filler material 112 pushes insert 111 along fiber 106 until flat surface 116 of insert 111 abuts wall 110. Wall 110, while illustrated as a planar surface, need only be planar in the portion which contacts surface 116 of insert 111. Arrows 114 indicate the direction of the force applied by the filler material to insert 111. Positions 111' and 111", both in phantom lines, respectively indicate an intermediate and final position of insert 111. The sliding of insert 111 until abutment with surface 110 reduces any bends in fiber 106 by forcing any excess fiber through aperture 109. The sliding action of insert 111 also centers fiber 106 in aperture 109 and maintains fiber 106 substantially perpendicular to wall 110.

Figure 2:
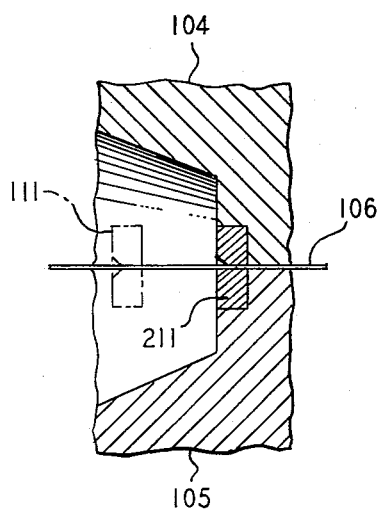
FIG. 2 is a partial cross-sectional view of the mold cavity of FIG. 1 showing a structural modification thereto.
Figure 3:
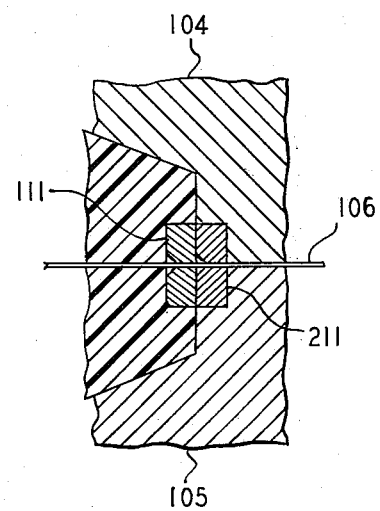
FIG. 3 is a partial cross-sectional view of the mold cavity of FIG. 2 after molding.

To insure full abutment of surface 116 against wall 110, the portion of wall 110 which is in contact with surface 116 should be free of burrs or debris. The preferable technique of satisfying this requirement is to embed a jewel within the portion of 110 surrounding aperture 109. As shown in FIG. 2, insert 211, identical to insert 111, is disposed within wall 110. FIG. 3 illustrates the abutment of inserts 111 and 211 when mold cavity 101 is completely filled.

Figure 4:
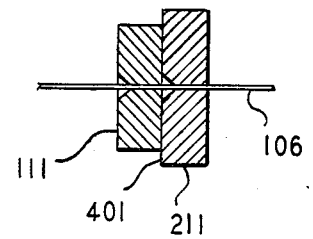
FIGS. 4 and 5 are two arrangements of abutting inserts used in the mold cavity of FIG. 2.
Figure 5:
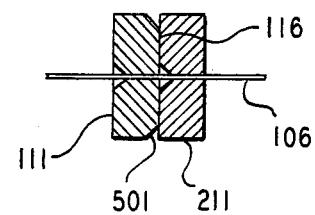

FIGS. 4 and 5 show further refinements in the use of inserts 111 and 211. By fabricating insert 211 to be larger than insert 111, as illustrated in FIG. 4, any roughness on the edges 401 of insert 211 will not prevent complete abutment of insert 111 against insert 211. Alternatively, the same benefit can be gained if the edges of one of the abutting surfaces are chamfered. This use of chamfers is shown in FIG. 5 wherein a chamfer 501 is formed on all edges of surface 116.

Figure 6:
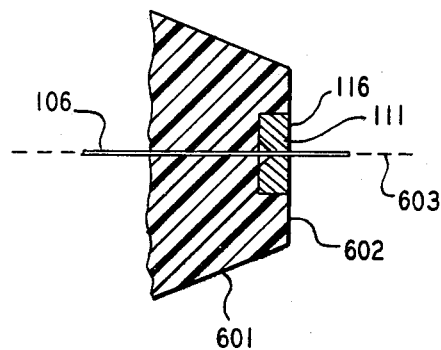
FIG. 6 is a partial cross-section view of the molded mating end of the illustrative optical fiber connector.

Refer now to FIG. 6. After molding, insert 111 is embedded within frustoconical end 601, formed by mold portion 103, with surface 116 substantially flush with end face 602. Fiber 106 extends from end face 602 and is precisely positioned with respect to the longitudinal axis 603 of the optical connector.

Connectors were molded using a circular jewel insert having a diameter of 1.5 mm, a thickness of 0.75 mm and a 110 $\mu$m hole. Using this jewel insert with a nominal 110 $\mu$m diameter optical fiber, the offset of fiber 106 with respect to axis 603 is held to 1 $\mu$m. This offset is two to three times less than the offset obtainable without the use of insert 111. In addition, the fiber deflection angle, i.e., the angle between axis 603 and fiber 106 is maintained less than 0.2 degrees as compared to a one degree variation without insert 111. Such control of offset and fiber deflection angle assures precise alignment of the fiber cores when the frustoconical ends of two optical connectors are coupled together. Moreover, the significant reduction in offset and fiber deflection angle permits the utilization of mold cavity 101 for the fabrication of either multimode or monomode optical fiber connectors. Heretofore, the latter has required a complex and expensive machined structure to align precisely the smaller core diameters of monomode fibers end to end.

Figure 7:
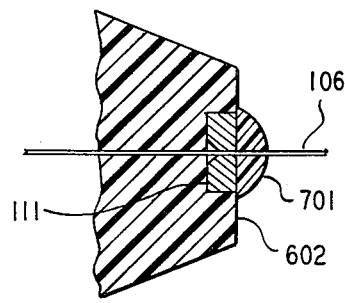
FIG. 7 is a partial cross-section view of the illustrative optical fiber connector after application of a epoxy drop on the protruding fiber end.
Figure 8:
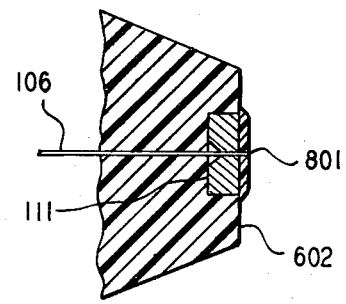
FIG. 8 shows a partial cross-section view of the illustrative optical fiber connector after lapping and polishing.

FIGS. 7 and 8 show the end preparation of protruding fiber 106. A drop of epoxy 701 is applied on end face 602. After the epoxy cures, the fiber end is cut, lapped and polished to form a fiber end face 801, as shown in FIG. 8, substantially parallel to connector end face 602.

While the above description has been directed to a single fiber connector the present invention is also applicable to multi-fiber connectors. Such application would only require the insertion and positioning of multiple inserts, i.e., one for each fiber, within the mold cavity.

I claim:

1. An improved method of molding an optical fiber connector with a body portion (601) having a predetermined shape for mating comprising the steps of placing an optical fiber (106) in a mold cavity (101), said fiber extending from a first aperture (107) to a second aperture (109), said second aperture being disposed in a mold surface (110) defining a corresponding surface (602) of said body portion; and injecting filler material (112) into said mold cavity from one or more predetermined locations (113) to form said optical fiber connector, said improvement being CHARACTERIZED BY the steps of inserting said optical fiber through an insert (111) having an aperture that slidingly receives said optical fiber;

positioning said insert between said predetermined locations and said mold surface; and causing said insert to slide along said fiber under the pressure of the injected filler material until said insert abuts said mold surface thereby straightening the optical fiber and controlling the position and angle of said optical fiber relative to said mold surface.

2. An improved method of molding an optical fiber connector with a body portion (601) having a predetermined shape for mating comprising the steps of inserting an optical fiber (106) through the mold cavity (101) from a first aperture (107) to a second aperture (109), said second aperture being disposed in a planar mold surface (110) defining a surface of said body portion; and injecting filler material (112) into said mold cavity from one or more predetermined locations (113) to form said optical fiber connector, said improvement being CHARACTERIZED BY the steps of inserting said optical fiber through an insert (111) having an aperture that slidingly receives said optical fiber, said insert having a flat surface substantially perpendicular to the insert aperture;

positioning said insert between said predetermined locations and said planar mold surface, the flat surface of said insert oriented toward said planar mold surface; and causing said insert to slide along said fiber under the pressure of the injected filler material until said flat insert surface abuts said planar mold surface thereby straightening the optical fiber and controlling the position and angle of said optical fiber relative to said planar mold surface.

3. The method of claim 2 wherein said second aperture is formed within a second insert disposed within said planar mold surface, the flat surface of the first-recited insert being abutted against a second flat surface on said second insert by the pressure of said injected filler material.

4. The method of claim 3 wherein said second flat surface and the first recited flat surface are the same size.

5. The method of claim 3 wherein the size of said flat surface is smaller than the size of said second flat surface to preclude contact of the edges of said flat surface against the edges of said second flat surface when said insert and second insert are in abutment.

6. The method of claim 4 wherein the edge of the first recited flat surface is chamfered (501).

7. The method of claim 4 wherein the edges of said second flat surface are chamfered.

* * * * *